United States Patent
Min et al.

(10) Patent No.: US 12,374,687 B2
(45) Date of Patent: Jul. 29, 2025

(54) POSITIVE POLE ACTIVE MATERIAL FOR LITHIUM SECONDARY BATTERY AND MANUFACTURING METHOD THEREOF, LITHIUM SECONDARY BATTERY

(71) Applicants: POSCO, Pohang-si (KR); Research Institute of Industrial Science & Techology, Pohang-si (KR); POSCO Chemical Co., Ltd., Pohang-si (KR)

(72) Inventors: Sung Hwan Min, Gumi-si (KR); Jeong Han Kim, Gumi-si (KR); Jung Hoon Song, Seoul (KR)

(73) Assignees: POSCO, Pohang-si (KR); RESEARCH INSTITUTE OF INDUSTRIAL SCIENCE & TECHNOLOGY, Pohang-si (KR); POSCO CHEMICAL CO., LTD., Pohang-si (KR)

( * ) Notice: Subject to any disclaimer, the term of this patent is extended or adjusted under 35 U.S.C. 154(b) by 391 days.

(21) Appl. No.: 17/988,303

(22) Filed: Nov. 16, 2022

(65) Prior Publication Data

US 2023/0078432 A1    Mar. 16, 2023

Related U.S. Application Data

(63) Continuation of application No. 16/957,027, filed as application No. PCT/KR2018/016148 on Dec. 18, 2018, now abandoned.

(30) Foreign Application Priority Data

Dec. 22, 2017  (KR) ......................... 10-2017-0178837

(51) Int. Cl.
*H01M 4/505* (2010.01)
*H01M 4/525* (2010.01)
(Continued)

(52) U.S. Cl.
CPC ........... *H01M 4/505* (2013.01); *H01M 4/525* (2013.01); *H01M 10/0525* (2013.01); *H01M 2004/028* (2013.01)

(58) Field of Classification Search
CPC .. H01M 4/505; H01M 4/525; H01M 10/0525; H01M 2004/028; H01M 4/0471;
(Continued)

(56) References Cited

U.S. PATENT DOCUMENTS

2009/0068561 A1   3/2009 Sun et al.
2015/0329374 A1   11/2015 Min
(Continued)

FOREIGN PATENT DOCUMENTS

CN    103326011 A    9/2013
CN    104993121 A    10/2015
(Continued)

OTHER PUBLICATIONS

Chen et al. "The formation, detriment and solution of residual lithium compounds on Ni-rich layered oxides in lithium-ion batteries." Frontiers in Energy Research, Dec. 2020, vol. 8, article 593009 (Year: 2020).*

(Continued)

*Primary Examiner* — Michael L Dignan
(74) *Attorney, Agent, or Firm* — Morgan Lewis & Bockius LLP

(57) ABSTRACT

A positive electrode active material for a lithium secondary battery comprising a compound represented by Chemical Formula 1 is introduced.

$$Li_{1+m}Ni_{1-w-x-y-z}Co_wMn_xM1_yM2_zO_{2-p}X_p \quad \text{[Chemical Formula 1]}$$

(In the Chemical Formula 1,
M1 and M2 are different from each other, and any one element selected from the group consisting of Al, Mg,
(Continued)

Zr, Sn, Ca, Ge, Ti, Cr, Fe, Zn, Y, Ba, La, Ce, Sm, Gd, Yb, Sr, Cu and Ga respectively, X is any one element selected from the group consisting of F, N, S, and P, w, x, y, z, p and m are respectively $0.125<w<0.202$, $0.153<x<0.225$, $0\leq y\leq 0.1$, $0\leq z\leq 0.1$, $0.34\leq w+x\leq 0.36$, $0\leq p\leq 0.1$, and $-0.1\leq m\leq 0.2$.)

9 Claims, 6 Drawing Sheets

(51) Int. Cl.
*H01M 10/0525* (2010.01)
*H01M 4/02* (2006.01)

(58) Field of Classification Search
CPC ........ H01M 4/131; H01M 4/50; H01M 4/523; H01M 10/052; C01G 53/82; C01G 53/50; C01G 53/00; C01P 2004/03; C01P 2004/50; C01P 2004/61; C01P 2004/62; Y02E 60/10

See application file for complete search history.

(56) References Cited

U.S. PATENT DOCUMENTS

| | | | |
|---|---|---|---|
| 2015/0340683 A1 | 11/2015 | Hamano et al. | |
| 2016/0064738 A1 | 3/2016 | Higuchi | |
| 2016/0181611 A1* | 6/2016 | Cho | H01M 4/366 429/223 |
| 2017/0018767 A1 | 1/2017 | Park et al. | |
| 2017/0084915 A1 | 3/2017 | Hah et al. | |
| 2017/0125796 A1 | 5/2017 | Kamiyama | |
| 2017/0324090 A1 | 11/2017 | Ryoshi et al. | |
| 2018/0241036 A1 | 8/2018 | Jo | |
| 2019/0157681 A1 | 5/2019 | Ho | |
| 2019/0379086 A1 | 12/2019 | Yoo | |
| 2020/0161650 A1 | 5/2020 | Park | |
| 2021/0135210 A1 | 5/2021 | Kawakita | |

FOREIGN PATENT DOCUMENTS

| | | | | |
|---|---|---|---|---|
| CN | 106463715 A | | 2/2017 | |
| CN | 110165193 | * | 8/2019 | ............. B82Y 30/00 |
| EP | 2698351 A1 | | 2/2014 | |
| EP | 3331067 A1 | | 6/2018 | |
| EP | 3428124 A1 | | 1/2019 | |
| JP | 2003-086182 A | | 3/2003 | |
| JP | 2005-235624 A | | 9/2005 | |
| JP | 2006-107845 A | | 4/2006 | |
| JP | 2010-212228 A | | 9/2010 | |
| JP | 4595475 B2 | | 12/2010 | |
| JP | 2012-230898 A | | 11/2012 | |
| JP | 2015-122269 A | | 7/2015 | |
| JP | 2015-173122 A | | 10/2015 | |
| KR | 10-2011-0073630 A | | 6/2011 | |
| KR | 10-1115416 B1 | | 2/2012 | |
| KR | 10-1443359 B1 | | 9/2014 | |
| KR | 10-2015-0133954 | * | 12/2015 | ............. H01M 4/36 |
| KR | 10-1632887 B1 | | 6/2016 | |
| KR | 10-2017-0008164 A | | 1/2017 | |
| KR | 10-2017-0063312 A | | 6/2017 | |
| KR | 10-2017-0063395 A | | 6/2017 | |
| KR | 10-2017-0075596 A | | 7/2017 | |
| TW | 201027830 A | | 7/2010 | |
| WO | 2016/038983 A1 | | 3/2016 | |

OTHER PUBLICATIONS

Yang et al. "Insights into the inner structure of high-nickel agglomerate as high-performance lithium-ion cathodes." Journal of Power Sources (2016) 487-494 (Year: 2016).*

Cheng et al. "Highly ordered structure in single-crystalline LiNi0.65Co0.15Mn0.2O2 with promising Li-ion storage property by precursor pre-oxidation." Journal of Solid State Chemistry (2021) 122045 (Year: 2021).*

KR 10-2015-0133954 machine English translation (Year: 2015).*

Feng Hailan et al., "Current status of technological and industrial development of lithium nickel cobalt aluminate (NCA), a cathode material for high energy density lithium-ion batteries", 2015, Advanced Materials Industry, Issue 9, p. 23-27, See English Abstract.

Zheng, "Tuning of Thermal Stability in Layered Li(NixMnyCoz)O2", 2016, Journal of the American Chemical Society, vol. 138, 14 pages total.

Notice of Allowance issued May 24, 2023 for corresponding Chinese Patent Application No. 201880090247.3 (See English Translation).

International Search Report dated Apr. 8, 2019 issued in International Patent Application No. PCT/KR2018/016148 (with English translation).

Non-Final Office Action dated Jul. 13, 2022 issued in U.S. Appl. No. 16/957,027.

Extended European Search Report dated Feb. 24, 2021 issued in European Patent Application No. 18892215.7.

Japanese Office Action dated Aug. 31, 2021 issued in Japanese Patent Application No. 2020-533570.

Japanese Notice of Allowance dated Dec. 22, 2021 issued in Japanese Patent Application No. 2020-533570.

* cited by examiner

[FIG. 1]
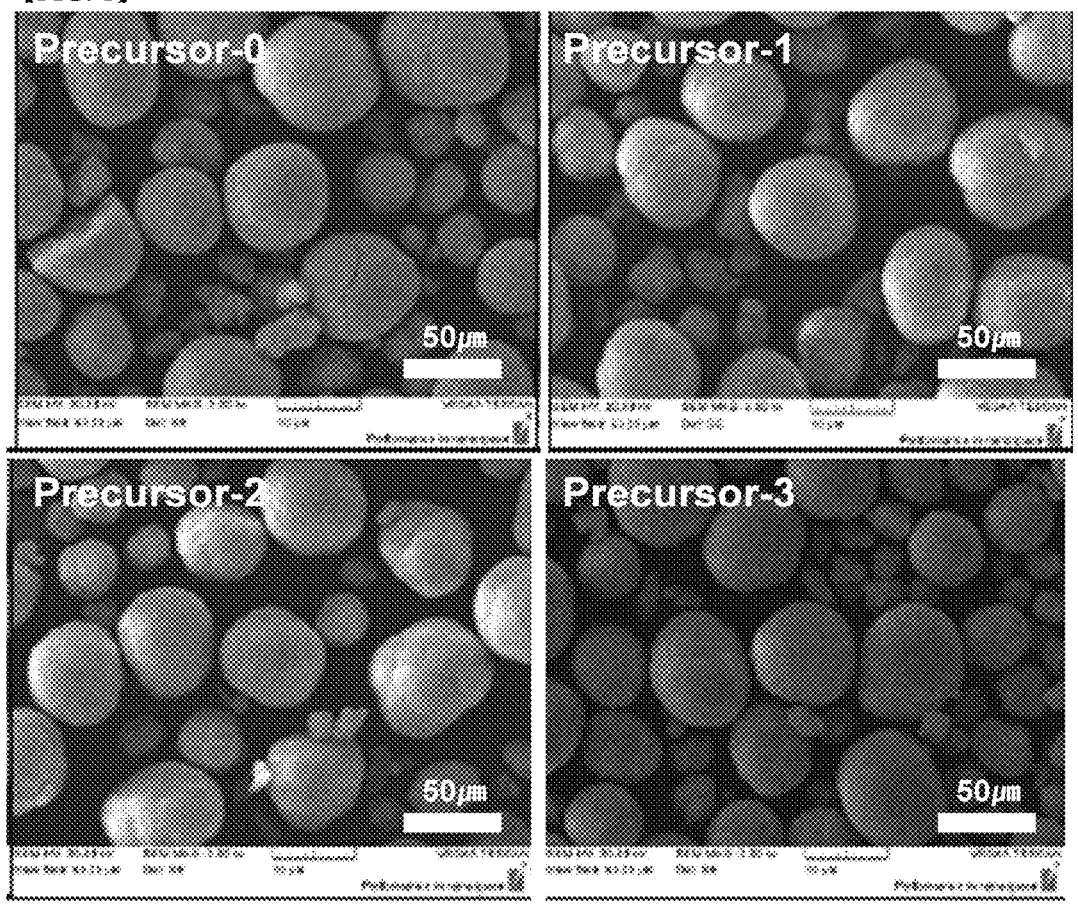

[FIG. 2]
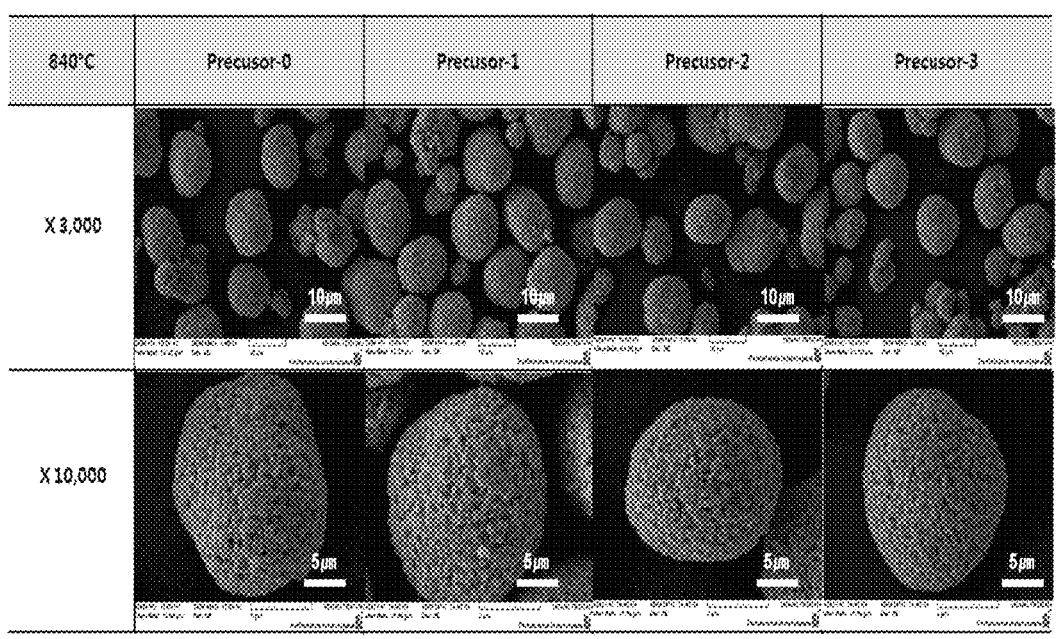

[FIG. 3]
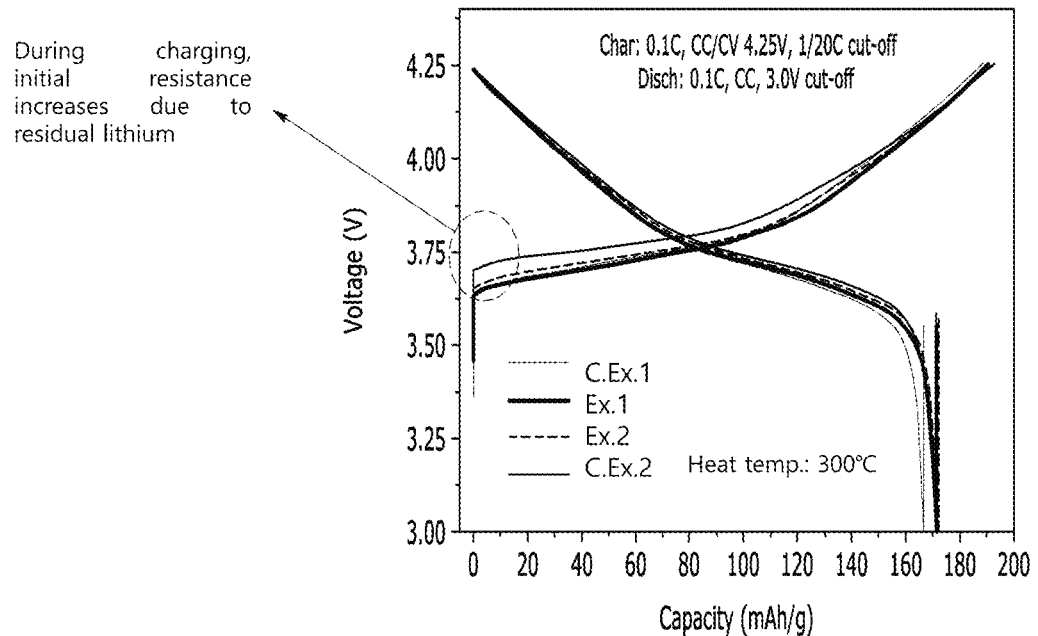

[FIG. 4]
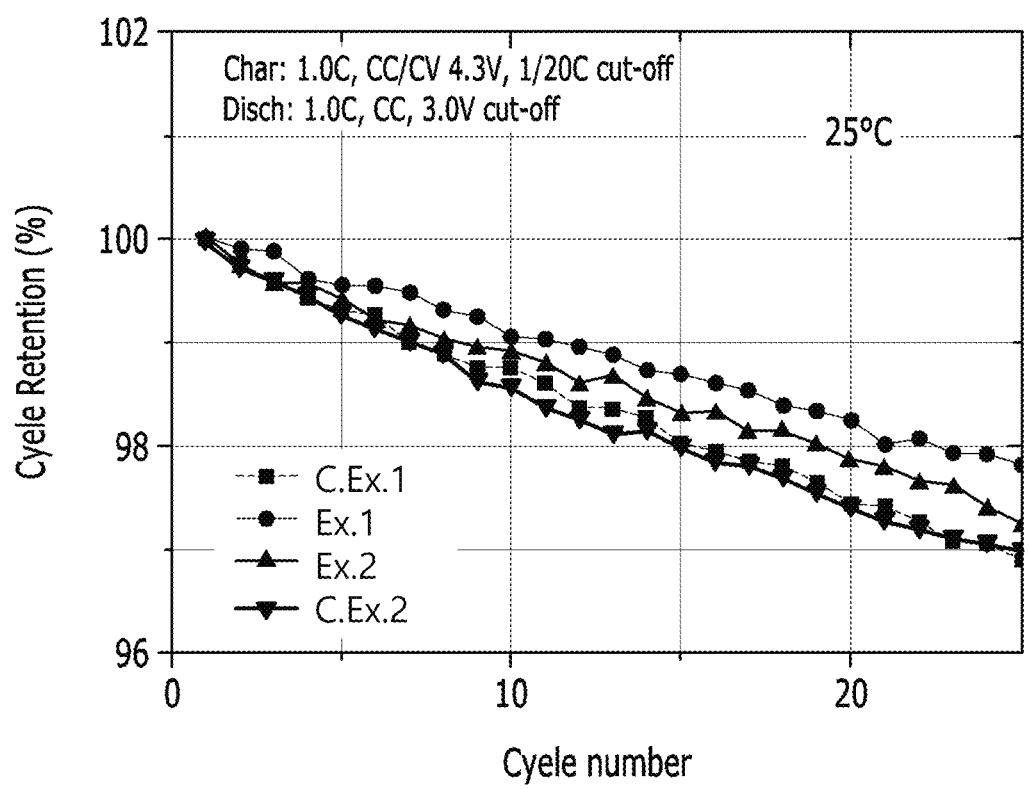

[FIG. 5]
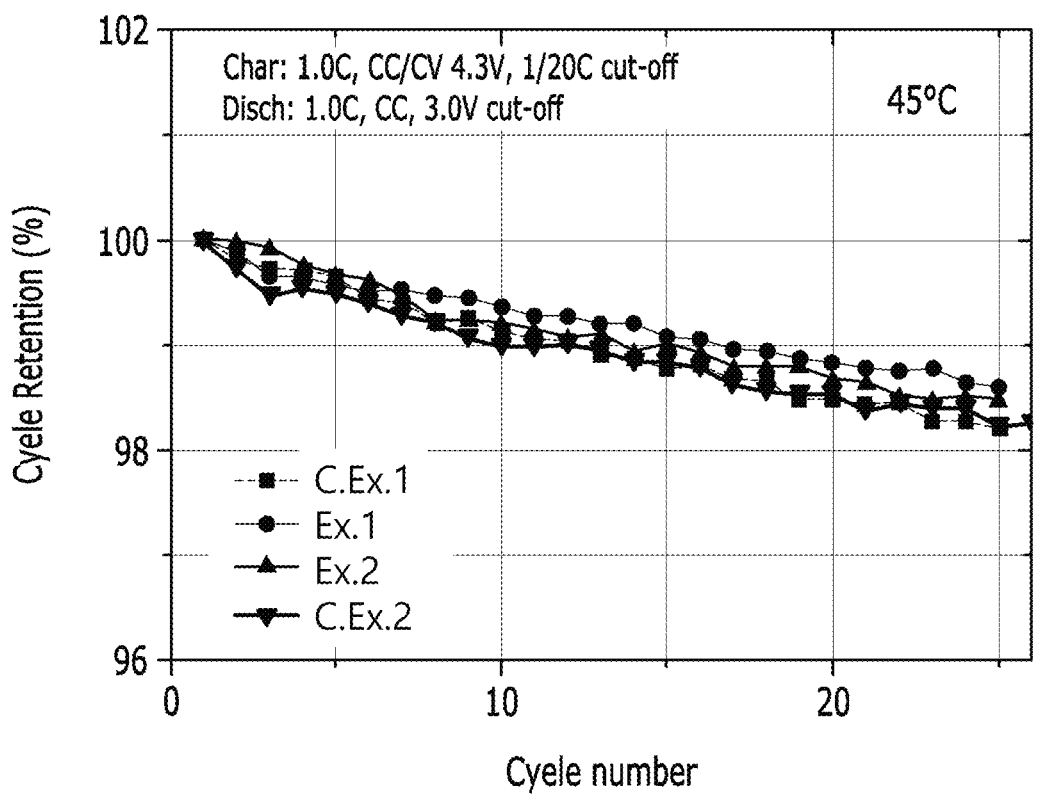

[FIG. 6]
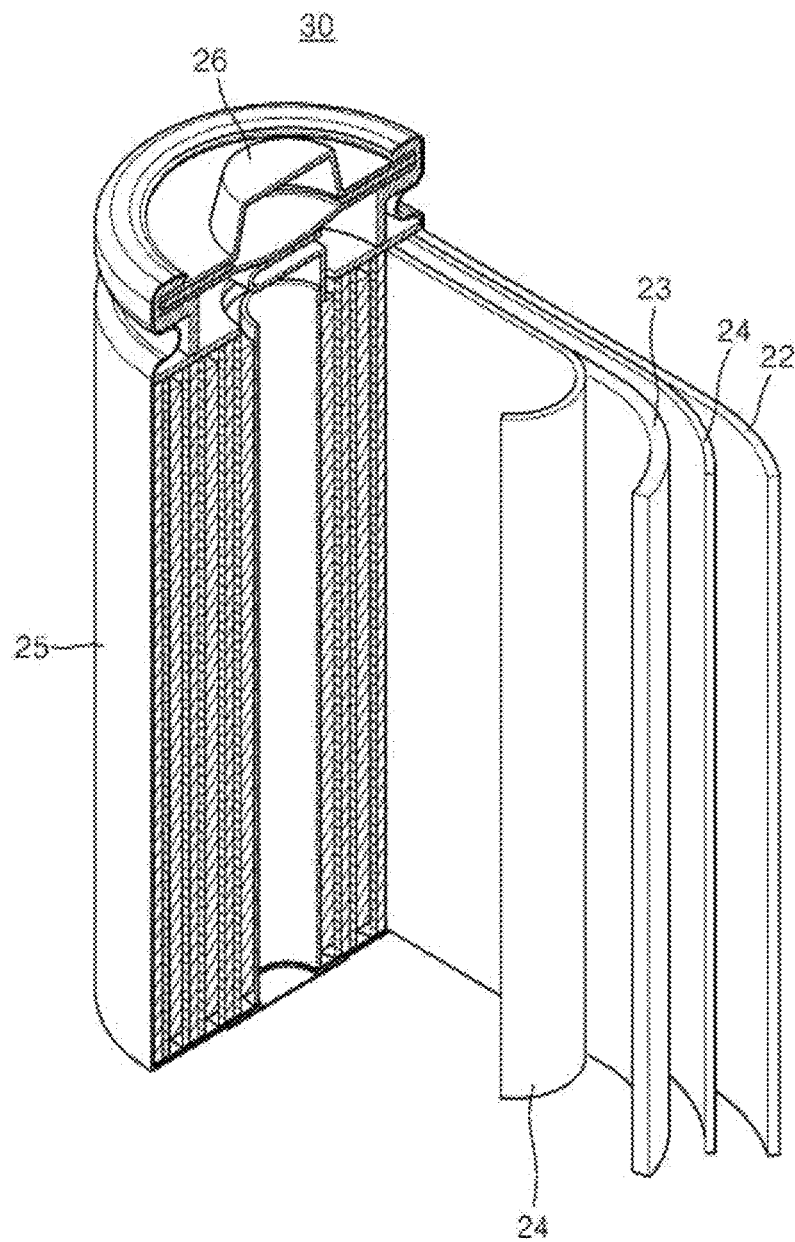

POSITIVE POLE ACTIVE MATERIAL FOR LITHIUM SECONDARY BATTERY AND MANUFACTURING METHOD THEREOF, LITHIUM SECONDARY BATTERY

CROSS-REFERENCE OF RELATED APPLICATIONS

This application is a continuation of U.S. patent application Ser. No. 16/957,027, filed on Jun. 22, 2020, which is the U.S. National Phase under 35 U.S.C. § 371 of International Patent Application No. PCT/KR2018/016148, filed on Dec. 18, 2018, which in turn claims the benefit of Korean Application No. 10-2017-0178837, filed on Dec. 22, 2017, the entire disclosures of which applications are incorporated by reference herein.

TECHNICAL FIELD

The present disclosure relates to a positive electrode active material precursor for an excellent lithium secondary battery, a positive electrode active material for a lithium secondary battery and a lithium secondary battery.

BACKGROUND

Recently, portable and wireless electronic devices such as AV devices and PC are rapidly progressing, and the demand for a rechargeable battery having a high energy density in a small and light weight as a driving power source is increasing. In addition, electric vehicles and hybrid vehicles have been developed and put into practical use for the global environment, and the demand for excellent storage characteristics of lithium ion secondary batteries is increasing. Under these circumstances, a lithium ion secondary battery having a large charge and discharge capacity and a improved cycle-life characteristic is interested.

Conventionally, positive electrode active materials useful for high energy lithium ion secondary batteries having a voltage of 4V class include spinel type $LiMn_2O_4$, zigzag layered structure $LiMnO_2$, layered rock salt type structure $LiCoO_2$, $LiNiO_2$, etc. Lithium ion secondary batteries using $LiNiO_2$ are attracting attention as batteries with high charge and discharge capacity. However, since this material has poor heat stability during charging and low charge and discharge cycle durability, further improvement in characteristics is required.

That is, when lithium is extracted in $LiNiO_2$, $Ni^{3+}$ becomes $Ni^{4+}$, which causes a structure transformation, and when Li is additionally extracted from the region where 0.45 mol of Li is extracted, the crystal structure changes from a monoclinic crystal to a hexagonal system.

Therefore, by repeating the charge and discharge reaction, the crystal structure becomes unstable and the cycle characteristic deteriorates.

In order to solve this problem, research has been conducted on a material in which Co and Al are added to a part of Ni of $LiNiO_2$, but a material that solves this problem has not yet been obtained, and a more crystalline Li—Ni-based composite oxide is required.

DISCLOSURE

Problem to Solve

An exemplary embodiment is to provide a positive electrode active material for a lithium secondary battery that suppresses the amount of lithium remaining on the surface and can expect an excellent electrochemical characteristic of the rechargeable battery.

Solution of Problem

The positive electrode active material for lithium secondary battery according to an exemplary embodiment of the present invention includes a compound represented by the following Chemical Formula 1.

$$Li_{1+m}Ni_{1-w-x-y-z}Co_wMn_xM1_yM2_zO_{2-p}X_p \quad \text{[Chemical Formula 1]}$$

(In the Chemical Formula 1,

M1 and M2 are different from each other, and any one element selected from the group consisting of Al, Mg, Zr, Sn, Ca, Ge, Ti, Cr, Fe, Zn, Y, Ba, La, Ce, Sm, Gd, Yb, Sr, Cu and Ga respectively,
)

The positive electrode active material comprises a compound represented by the following Chemical Formula 2.

$$Li_{1+m}Ni_{1-w-x}Co_wMn_xO_{2-p}X_p \quad \text{[Chemical Formula 2]}$$

(In the Chemical Formula 2,

X is any one element selected from the group consisting of F, N, S, and P, w, x and m are respectively $0.351 \leq w+x \leq 0.354$, $0 \leq p \leq 0.1$, $-0.1 \leq m \leq 0.2$.)

It may be $1.01 \leq x/w \leq 1.36$.

An amount of Li remaining on the surface of the positive electrode active material is 5,000 ppm to 12,000 ppm.

An average particle diameter of a primary particles of the positive electrode active material may be 0.1 μm to 1 μm.

The positive active material is a secondary particle, and D50 particle diameter of the secondary particles is 7 μm to 15 μm.

A method for manufacturing a positive active material for lithium secondary battery according to an exemplary embodiment of the present invention comprises obtaining a precursor by co-precipitation reaction of a nickel raw material, a cobalt raw material, a manganese raw material and a heterogeneous raw material; and obtaining a positive electrode active material represented by Chemical Formula 1 below by mixing and sintering the precursor and lithium raw material.

$$Li_{1+m}Ni_{1-w-x-y-z}Co_wMn_xM1_yM2_zO_{2-p}X_p \quad \text{[Chemical Formula 1]}$$

(In the Chemical Formula 1,

M1 and M2 are different from each other, and any one element selected from the group consisting of Al, Mg, Zr, Sn, Ca, Ge, Ti, Cr, Fe, Zn, Y, Ba, La, Ce, Sm, Gd, Yb, Sr, Cu and Ga respectively, X is any one element selected from the group consisting of F, N, S, and P, w, x, y, z, p and m are respectively $0.125 < w < 0.202$, $0.153 < x < 0.225$, $0 \leq y \leq 0.1$, $0 \leq z \leq 0.1$, $0.34 \leq w+x \leq 0.36$, $0 \leq p \leq 0.1$, and $-0.1 \leq m \leq 0.2$.)

In the step of obtaining the positive active material, the mixed precursor and lithium raw material may be sintered at 700° C. to 900° C. and then heat treated.

In the step of obtaining the positive active material, the heat treatment temperature may be 250° C. to 350° C.

In the step of obtaining the positive active material, the heat treatment temperature may be 280° C. to 320° C.

A lithium secondary battery, comprises a positive electrode; a negative electrode; and an electrolyte; the positive electrode comprising a positive electrode active material according to an exemplary embodiment of the present invention.

Effect

By controlling the content of manganese and cobalt, the amount of lithium remaining on the surface of the positive electrode active material is suppressed, and a positive electrode active material capable of manufacturing excellent lithium secondary battery with excellent initial efficiency and capacity retention rate can be expected.

By controlling the heat treatment temperature, it is possible to expect a positive electrode active material capable of manufacturing an excellent lithium secondary battery with excellent initial efficiency and capacity retention.

BRIEF DESCRIPTION OF DRAWINGS

FIG. 1 is a drawing showing a scanning electron microscope (SEM) photograph of an exemplary embodiment and a comparative example.

FIG. 2 is a drawing showing an active material SEM (scanning electron microscope) picture of an exemplary embodiment and Comparative Example.

FIG. 3 is a drawing showing a graph of resistance when charging the battery of the exemplary embodiment and Comparative Example.

FIG. 4 is a graph showing the capacity retention rate after driving 25 cycles compared to the initial of the exemplary embodiment and comparative example.

FIG. 5 is a graph showing the capacity retention rate after driving 25 cycles compared to the initial of the exemplary embodiment and comparative example.

FIG. 6 is a drawing schematically showing a typical structure of a lithium battery according to an embodiment of the present invention.

DESCRIPTION

Hereinafter, various embodiments of the present invention will be described in detail with reference to the accompanying drawings so that those skilled in the art to which the present invention belongs can easily practice. The present invention can be implemented in many different forms and is not limited to the implementations described herein.

In order to clearly describe the present invention, parts not related to the description are omitted, and the same reference numerals are assigned to the same or similar constituent elements throughout the specification.

In addition, since the size and thickness of each component shown in the drawing are arbitrarily shown for convenience of explanation, the present invention is not necessarily limited to what is shown. In the drawings, the thickness of layers, films, panels, regions, etc., are exaggerated for clarity. And in the drawing, for convenience of explanation, the thickness of some layers and regions is exaggerated.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Also, being "above" or "top" of a reference part is to position above or below the reference part, and does not necessarily mean to be "above" or "top" toward the opposite direction of gravity.

In addition, unless explicitly described to the contrary, the word "comprise", and variations such as "comprises" or "comprising", will be understood to imply the inclusion of stated elements but not the exclusion of any other elements.

Positive Electrode Active Material for Lithium Secondary Battery

As one embodiment according to the present invention, the positive electrode active material for lithium secondary battery includes a compound represented by the following Chemical Formula 1.

$$Li_{1+m}Ni_{1-w-x-y-z}Co_wMn_xM1_yM2_zO_{2-p}X_p \quad \text{[Chemical Formula 1]}$$

In the Chemical Formula 1, M1 and M2 are different from each other, and any one element selected from the group consisting of Al, Mg, Zr, Sn, Ca, Ge, Ti, Cr, Fe, Zn, Y, Ba, La, Ce, Sm, Gd, Yb, Sr, Cu and Ga respectively.

X is any one element selected from the group consisting of F, N, S, and P; and w, x, y, z, p and m are respectively $0.125<w<0.202$, $0.153<x<0.225$, $0≤y≤0.1$, $0≤z≤0.1$, $0.34≤w+x≤0.36$, $0≤p≤0.1$, and $-0.1≤m≤0.2$.

The lithium nickel-based positive electrode active material is prepared by mixing and sintering the precursor and lithium raw material. In this manufacturing process, lithium impurities such as $Li_2CO_3$ and LiOH remain on the surface of the positive electrode active material.

Lithium impurities remaining on the surface of the positive electrode active material react with $CO_2$ or $H_2O$ in the air to form $Li_2CO_3$. Due to this, initial non-reversible capacity is formed, and there are problems such as interfering with lithium ion movement of the positive electrode active material surface.

To solve this problem, it is necessary to control the amount of lithium remaining on the surface of the positive electrode active material. Specifically, the amount of lithium remaining on the positive electrode active material surface can be suppressed by maintaining the nickel content above a certain value, but by increasing the content of manganese.

The content of nickel may be 0.66 or more. When the nickel content is low, the expression capacity of the rechargeable battery may be lowered. The content of manganese may be greater than 0.153 and less than 0.225. If it is 0.153 or less, the content of Co, an expensive element, is relatively high and may affect structural stability. On the other hand, when it is 0.225 or more; since the content of cobalt and doping elements may be relatively decreased, electrochemical characteristics such as initial efficiency of the rechargeable battery may not be good.

The amount of cobalt may be greater than 0.125 and less than 0.202. If it is 0.125 or less, the electrochemical characteristics such as initial efficiency of the rechargeable battery may not be good. On the other hand, when it is 0.202 or more, it may be difficult to suppress the amount of lithium remaining on the positive electrode active material surface because the content of manganese can be relatively reduced.

That is, it is possible to suppress the amount of lithium remaining on the positive electrode active material surface by controlling the content of manganese and cobalt in a state where the amount of nickel is maintained above a certain value, and at the same time, an excellent electrochemical characteristic can be expected.

M1 and M2 are heterogeneous elements doped with positive electrode active material, Al, Mg, Zr, Sn, Ca, Ge, Ti, Cr, Fe, Zn, Y, Ba, La, Ce, Sm, Gd, Yb, Sr, Cu and Ga are selected differently from each other. Both may have a content of 0 or more and 0.1 or less.

X may be selected from the group consisting of F, N, S, and P as coating elements. m is a value satisfying $-0.1≤m≤0.2$.

The positive electrode active material for a lithium secondary battery according to the present invention may include the compound represented by Chemical Formula 2 as the positive active material.

$$Li_{1+m}Ni_{1-w-x}Co_wMn_xO_{2-p}X_p \quad \text{[Chemical Formula 2]}$$

In the Chemical Formula 2, X is any one element selected from the group consisting of F, N, S, and P; and w, x and m are respectively $0.351 \leq w+x \leq 0.354$, $0 \leq p \leq 0.1$, $-0.1 \leq m \leq 0.2$.

As the sum of the content of cobalt and manganese w+x is controlled to a numerical range of 0.351 or more and 0.354 or less, the nickel content may be 0.646 or more and 0.649 or less. As the nickel content satisfies the numerical range, it can be expected to secure electrochemical performance (capacity and cycle-life characteristic) and structural stability.

Specifically, it may be $1.01 \leq x/w \leq 1.36$. As mentioned above, it is possible to suppress the amount of lithium remaining on the positive electrode active material surface by controlling the content of manganese and cobalt in a state where the amount of nickel is maintained above a certain value, and at the same time, an excellent electrochemical characteristic can be expected. Therefore, the ratio of manganese content to cobalt content is controlled.

If the ratio of manganese content to cobalt content is less than 1.01 under conditions where the nickel content is 0.646 or more and 0.649 or less, it may be difficult to suppress the amount of lithium remaining on the positive electrode active material surface because the content of manganese is insufficient. On the other hand, when it exceeds 1.36, the content of cobalt is relatively reduced, so it is difficult to expect an excellent electrochemical characteristic of the rechargeable battery.

Specifically, the amount of Li remaining on the surface of the positive active material may be 5,000 ppm to 12,000 ppm.

When the amount of lithium remaining on the surface of the positive electrode active material is less than 5,000 ppm, lithium-containing impurities are less, and the performance of the battery may be improved. On the other hand, when it exceeds 12,000 ppm, problems such as $CO_2$ gas generation due to lithium-containing impurities on the positive electrode active material surface and lithium ion movement are hindered, so that the electrochemical characteristic of the rechargeable battery may be deteriorated.

The primary particle size of the positive active material may be 0.1 μm to 1 μm. As the primary particle size satisfies the numerical range, it can be expected that the effect of improving the mobility of lithium ion according to the primary particle size and the battery performance improves accordingly.

In addition, the positive active material is a secondary particle, the D50 particle diameter of the secondary particle may be 11 μm to 13 μm. D50 particle diameter refers to the diameter of particles with a cumulative volume of 50 volume % in the particle size distribution. As the D50 particle diameter of the secondary particle satisfies the numerical range, it is possible to expect the effect of improving the battery performance through the production of bimodal and improving the battery performance according to the particle size.

Positive Electrode Active Material Manufacturing Method for Lithium Secondary Battery A method for manufacturing a positive active material for lithium secondary battery according to an exemplary embodiment of the present invention comprises obtaining a precursor by co-precipitation reaction of a nickel raw material, a cobalt raw material, a manganese raw material and a heterogeneous raw material; and obtaining a positive electrode active material represented by Chemical Formula 1 below by mixing and sintering the precursor and lithium raw material.

First, a nickel raw material, a cobalt raw material, a manganese raw material, a heterogeneous raw material and a solvent are mixed through a co-precipitation reaction, but mixed to satisfy a stoichiometric ratio. The precipitant can be further mixed.

The nickel raw material is not particularly limited as long as it is a material in which nickel positive ions and any negative ions are ion-bonded and dissolved in water and dissociated into positive and negative ions. Specifically, it may be nickel sulfate, nickel sulfate hydrate or mixture thereof.

Further, the raw material of cobalt is not particularly limited as long as it is a material in which cobalt positive ions and any negative ions are ion-bonded and dissolved in water and dissociated into positive and negative ions. Specifically, it may be cobalt nitrate, cobalt sulfate, cobalt sulfate hydrate or mixture thereof.

The raw material of manganese is not particularly limited as long as it is a material in which manganese positive ions and any negative ions are ion-bonded and dissolved in water and dissociated into positive and negative ions. Specifically, it may be manganese nitrate, manganese sulfate, manganese sulfate hydrate or mixture thereof.

The heterogeneous raw material is a metal positive ion (eg, positive ion such as Al, Mg, Zr, Ti, Sn, Ca, Ge, Cr, Fe, etc.) excluding nickel, cobalt and manganese; and a negative ion; bonded material. These are not particularly limited as long as they are dissolved in water and dissociated into positive and negative ions. Specifically, it may be a nitrate of a heterogeneous element, a sulfate of a heterogeneous element, a sulfate hydrate of a heterogeneous element or a mixture thereof.

In the Chemical Formula 1, M1 and M2 are heterogeneous elements, respectively.

Deionized water may be used as the solvent.

Due to the introduction of the precipitating agent, raw materials are uniformly mixed in the atomic unit, particles are precipitated, and a solution in which residual salt is dissolved may be included.

The precipitating agent can function as a pH adjusting agent. An alkali solution having a hydroxyl group selected from sodium hydroxide (NaOH), potassium hydroxide (KOH) and lithium hydroxide (LiOH), or a mixture thereof may be used.

Specifically, a 2.0 to 4.0 M concentration sodium hydroxide (NaOH) aqueous solution may be used. Ammonia $NH_3$ aqueous solution of 0.5 to 2.0M concentration may be further added to favor shape control of the finally obtained precursor.

The solvent can be controlled so that the molar concentration of metal in the solution is 1.0M to 2.5M in a solution in which a nickel raw material, a cobalt raw material, a manganese raw material and a heterogeneous raw material are mixed. The molar concentration of metal in the solution satisfies the numerical range, thereby maintaining a balanced ratio of the final obtained precursor and expecting a stable shape.

A coating layer can be formed on the surface of metal hydroxide particles.

The precursor produced through the step of obtaining the precursor may include a metal hydroxide represented by Chemical Formula 3 below.

$$Ni_{1-w-x-y-z}Co_wMn_xM1_yM2_z(OH)_{2-p}X_p \quad \text{[Chemical Formula 3]}$$

In the Chemical Formula 3, M1 and M2 are different from each other, and are any one element selected from the group consisting of Al, Mg, Zr, Sn, Ca, Ge, Ti, Cr, Fe, Zn, Y, Ba, La, Ce, Sm, Gd, Yb, Sr, Cu and Ga respectively.

X is any one element selected from the group consisting of F, N, S, and P. w, x, y, z and p are $0.125<w<0.202$, $0.153<x<0.225$, $0 \le y \le 0.1$, $0 \le z \le 0.1$, $0.34 \le w+x \le 0.36$, $0 \le p \le 0.1$, respectively.

Next, the precursor and lithium raw material are mixed. For the precursor, the lithium raw material can be mixed in a molar ratio of 0.90:1 to 1.2:1 (lithium raw material: precursor). In addition, lithium compounds such as lithium hydroxide (LiOH) and lithium carbonate ($Li_2CO_3$), which are generally used in the manufacture of positive electrode active materials, may be used as the lithium raw material.

After mixing and sintering, a positive electrode active material is obtained. At this time, the sintering temperature may be 700° C. to 900° C., and the speed of increasing temperature may be 1.0 to 4.0° C./min. When sintering under the above conditions, it is possible to improve the performance of the battery by improving the size and crystallinity of the primary and secondary particles.

In the step of obtaining the positive active material, it can be calcined and then heat treated.

The heat treatment temperature may be 250° C. to 350° C. Specifically, it may be 280° C. to 320° C.

When the heat treatment temperature is less than 250° C., the remaining lithium on the positive electrode active material surface is not properly volatilized due to insufficient heat temperature, so suppression of the residual lithium amount may be difficult. On the other hand, when the temperature exceeds 350° C., it may be possible to suppress a sufficient level of residual lithium, but it may cause side reactions due to additional sintering of the positive electrode active material.

Lithium Secondary Battery

A lithium secondary battery, comprises a positive electrode; a negative electrode; and an electrolyte; the positive electrode comprising a positive electrode active material according to an exemplary embodiment of the present invention.

The description related to the positive electrode active material will be omitted because it is as described above.

The positive electrode active material layer also includes a binder and a conductive material.

The binder not only attaches the positive electrode active material particles to each other but also adheres the positive electrode active material to the current collector.

For typical example, there may be polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like, but is not limited thereto.

The conductive material is used to give conductivity to the electrode, and any material can be the conductive material as long as the material is an electronic conductive material and it does not trigger a chemical change in the battery configured according to the method. For example, a conductive material may include metal powders such as natural graphite, artificial graphite, carbon black, acetylene black, ketjen black, carbon fiber, copper, nickel, aluminum, silver, or the like; metal fibers; and the like. Moreover, a mixture of one or more conductive materials such as polyphenylene derivatives or the like may be used.

The negative electrode includes a current collector and a negative electrode active material layer formed on the current collector, and the negative electrode active material layer includes a negative electrode active material.

The negative electrode active material includes materials capable of reversibly intercalating and deintercalating lithium ions, a lithium metal, lithium metal alloys, materials being capable of doping and dedoping lithium, and transition metal oxides.

A carbon material is one of the materials capable of reversibly intercalating and deintercalating lithium ions. Everything can be used as a carbon-based negative electrode active material normally used in the lithium ion battery. For typical example, one or both of crystalline carbon and amorphous carbon can be used. Example of the crystalline carbon is amorphous, plate, flake, spherical, or fiber shaped natural graphite or artificial graphite. Example of the amorphous carbon is soft carbon (low temperature fired carbon), hard carbon, mesophase pitch carbide, fired coke, or the like.

The alloys prepared by mixing lithium and a metal selected from the group consisting of Na, K, Rb, Cs, Fr, Be, Mg, Ca, Sr, Si, Sb, Pb, In, Zn, Ba, Ra, Ge, Al, and Sn can be used for the lithium metal alloys.

The materials being capable of doping and dedoping lithium are Si, $SiO_x$ ($0<x<2$), Si-Q alloys (wherein Q is an element selected from the group consisting of alkali metals, alkaline earth metals, group 13 elements, group 14 elements, transition metals, rare earth elements, or combinations thereof, except for Si), Sn, $SnO_2$, Sn—R (wherein R is an element selected from the group consisting of alkali metals, alkaline earth metals, group 13 elements, group 14 elements, transition metals, rare earth elements, or combinations thereof, except for Sn), and the like. Moreover, a mixture between at least one of them and $SiO_2$ also can be used as the materials being capable of doping and dedoping lithium.

The Q element or the R element is selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

The transition metal oxides are vanadium oxide, lithium vanadium oxide, and the like.

The negative electrode active material layer includes a binder, and may further selectively include a conductive material.

The binder serves to attach the negative electrode active material particles to each other and the negative electrode active material to the current collector. Typical examples include polyvinyl alcohol, carboxymethyl cellulose, hydroxypropyl cellulose, polyvinyl chloride, carboxylated polyvinyl chloride, polyvinyl fluoride, polymers containing ethylene oxide, polyvinylpyrrolidone, polyurethane, poly tetrafluoroethylene, polyvinylidene fluoride, polyethylene, polypropylene, styrene-butadiene rubber, acrylated styrene-butadiene rubber, epoxy resin, nylon, etc. can be used, but is not limited.

The conductive material is used to give conductivity to the electrode, and any material can be the conductive material as long as the material is an electronic conductive material and it does not trigger a chemical change in the battery configured according to the method. For example, the conductive material may include carbon-based materials such as natural graphite, artificial graphite, carbon black, acetylene black, ketjen black, carbon fiber, and the like; metal-based materials containing metal powders such as copper, nickel, aluminum, silver, and the like, metal fibers, and the like; conductive polymers such as polyphenylene derivatives; and a mixture thereof.

The current collector include a copper foil, a nickel foil, a stainless steel foil, a titanium foil, a nickel foam, a copper foam, a polymer substrate coated with conductive metals, and groups consisting of combinations thereof.

Al can be used as the current collector, but is not limited in addition.

The negative electrode and the positive electrode prepare the active material composition by mixing the active material, a conductive agent, and a binder in a solvent, and by coating the composition onto a current collector.

This electrode preparing method is well known in the art, thus a detailed description thereof will be omitted in the present specification.

N-methylpyrrolidone and the like may be used as the solvent, but the embodiment is not limited thereto.

The positive electrode and the negative electrode can be separated by a separator, and the separator can be used as long as it is commonly used in lithium batteries. Particularly, it is suitable that it has low resistance to ion migration of electrolyte and excellent absorption capacity of electrolyte solution. For example, as a material selected from glass fiber, polyester, teflon, polyethylene, polypropylene, polytetrafluoroethylene (PTFE), and combinations thereof, a non-woven fabric or woven fabric may be used. The separator has a pore diameter of 0.01-10 μm, and a thickness of 5-300 μm.

The lithium salt-containing non-aqueous electrolyte is composed of a non-aqueous electrolyte and lithium salt. Non-aqueous electrolytes include non-aqueous electrolytes, solid electrolytes, and inorganic solid electrolytes.

As the non-aqueous electrolyte, for example, aprotic organic solvents such as N-methyl-2-pyrrolidinone, propylene carbonate, ethylene carbonate, butylene carbonate, dimethyl carbonate, diethyl carbonate, gamma-Butyrolactone, 1,2-dimethoxy ethane, tetrahydroxy franc, 2-methyl tetrahydrofuran, dimethylsulfoxide, 1,3-dioxorun, formamide, dimethylformamide, dioxorun, Acetonitrile, nitromethane, methyl formate, methyl acetate, phosphoric triester, trimethoxy methane, dioxon derivative, sulfolane, methyl sulfolane, 1,3-dimethyl-2-imidazolidinone, propylene carbonate derivatives, tetrahydrofuran derivatives, ether, methyl pyropionate, and ethyl propionate can be used.

As the organic solid electrolyte, for example, polyethylene derivative, polyethylene oxide derivative, polypropylene oxide derivative, phosphate ester polymer, poly agitation lysine, polyester sulfide, polyvinyl alcohol, polyfluorovinylidene, polymers including ionic dissociative groups and the like can be used.

Examples of the inorganic solid electrolyte include nitrides, halides, sulfates, and silicates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, can be used.

The lithium salt can be used as long as it is commonly used in lithium batteries. As a material soluble in the non-aqueous electrolyte, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, 4-phenyl Boric acid lithium, imide and the like may be used.

Lithium battery can be classified into lithium ion battery, lithium ion polymer battery and lithium polymer battery according to the type of separator and electrolyte used, and can be classified into cylindrical, prismatic, coin-type, pouch-type, etc. according to shape. In addition, it can be divided into bulk type and thin film type according to size. Also, both lithium primary battery and lithium secondary battery are possible.

The manufacturing method of these batteries is widely known in this field, so a detailed description is omitted.

FIG. 6 schematically shows a representative structure of a lithium battery according to an embodiment of the present invention.

Referring to FIG. 6, the lithium battery 30 includes a positive electrode 23, a negative electrode 22 and a separator 24 dispose between the positive electrode 23 and the negative electrode 22. The above-described anode 23, negative electrode 22 and separator 24 are wound or folded to be accommodated in the battery container 25. Subsequently, electrolyte is injected into the battery container 25 and sealed with a sealing member 26 to complete the lithium battery 30. The battery container 25 may be cylindrical, square, thin film, or the like. The lithium battery may be a lithium ion battery.

The lithium battery is suitable for applications that require high-capacity, high power and high temperature driving, such as an electric vehicle, in addition to applications such as mobile phones and portable computers. It can be used in hybrid vehicles in combination with existing engines, fuel cells, supercapacitors, etc. In addition, the lithium battery can be used for all other applications requiring high power, high voltage and high temperature operation.

Hereinafter, a specific exemplary embodiment of the present invention will be described. However, the exemplary embodiment below is only an exemplary embodiment of the present invention, and the present invention is not limited to the exemplary embodiment below.

EXEMPLARY EMBODIMENT AND COMPARATIVE EXAMPLE

Exemplary Embodiment 1

1. Preparation of Positive Electrode Active Material $NiSO_4*6H_2O$, $CoSO_4*7H_2O$, and $MnSO_4*H_2O$ were metered so that the precursor content was the same as exemplary embodiment 1 in Table 1 below, and then dissolved in distilled water. The dissolved metal hydroxide solution is precipitated by reacting with ammonia and sodium hydroxide in the reactor.

The precipitated slurry was washed with water and solid-liquid was separated by using a pressure filter (filter press)

The residual moisture was removed using a high-pressure fresh air.

The solid-liquid separated active material was dried at 150° C. using a fluid bed dryer. After the dried precursor is mixed with $Li_2CO_3$, 4.0 kg of the mixed precursor is filled into a mullite material saggar, and then sintered in an air atmosphere in a furnace at an elevated temperature of 800° C. and 3.0° C./min. After that, it was kept at 250° C. to 350° C. for 12 hours. A total of sintering maintained for of 30 hours.

The sintered material was pulverized to obtain a positive electrode active material. The positive electrode active material of exemplary embodiment 1 is shown in Table 1 below.

2. Manufacture of Lithium Secondary Battery (Half-Cell)

The positive electrode active material, conductive material (Denka black), and binder (PVDF) prepared above were uniformly mixed in an N-methyl-2pyrrolidone solvent such that the mass ratio was 94:3:3. After the mixture was evenly applied to aluminum foil, it was compressed in a roll press and vacuum-dried in a 150° C. vacuum oven for 12 hours to prepare a positive electrode. Li-metal is used as a counter electrode, and 1 mol of $LiPF_6$ solution is used as a liquid electrolyte solution in a mixed solvent of ethylene carbonate (EC):ethyl methyl carbonate (EMC)=1:2 as the electrolyte solution. A half coin cell was manufactured according to a conventional manufacturing method.

Exemplary Embodiment 2

After measuring $NiSO_4*6H_2O$, $CoSO_4*7H_2O$, $MnSO_4*H_2O$ and dissolving it in distilled water so that the precursor content is the same as the exemplary embodiment 2 in Table 1 below, and then proceed to the same conditions as exemplary embodiment 1 and positive electrode active material was prepared. In addition, lithium secondary batteries were manufactured under the same conditions as exemplary embodiment 1.

Comparative Example 1

After measuring $NiSO_4*6H_2O$, $CoSO_4*7H_2O$, $MnSO_4*H_2O$ and dissolving it in distilled water so that the precursor content is the same as Comparative Example 1 in Table 1 below, and then proceed to the same conditions as exemplary embodiment 1 and positive electrode active material was prepared. In addition, lithium secondary batteries were manufactured under the same conditions as exemplary embodiment 1.

Comparative Example 2

After measuring $NiSO_4*6H_2O$, $CoSO_4*7H_2O$, $MnSO_4*H_2O$ and dissolving it in distilled water so that the precursor content is the same as Comparative Example 1 in Table 1 below, and then proceed to the same conditions as exemplary embodiment 2 and positive electrode active material was prepared. In addition, lithium secondary batteries were manufactured under the same conditions as exemplary embodiment 1.

TABLE 1

| Division | Comparative Example 1 | exemplary embodiment 1 | exemplary embodiment 2 | Comparative Example 2 |
|---|---|---|---|---|
| Content of nickel (mol %) | 65.0 | 64.6 | 64.9 | 64.5 |
| Content of cobalt (mol %) | 12.5 | 15.0 | 17.4 | 20.2 |
| Content of manganese (mol %) | 22.5 | 20.4 | 17.7 | 15.3 |
| Sum of cobalt + manganese (mol %) | 35.0 | 35.4 | 35.1 | 35.5 |
| manganese/ cobalt ratio | 1.8 | 1.36 | 1.0172 | 1.3203 |
| D50 diameter (μm) | 11.9 | 11.6 | 12.7 | 12.3 |

Property Evaluation

Evaluation Example 1 (Precursor and Active Material SEM)

Each precursor SEM is shown in FIG. 1, each active material SEM is shown in FIG. It is shown in 2.

According to FIGS. 1 and 2, it can be seen that there is no difference in appearance in each precursor and active material (sintered body), and only some differences in D50 particle diameter.

Precursor-0 represents Comparative Example 1, Precursor-1 represents exemplary embodiment 1, Precursor-2 represents exemplary embodiment 2, and Precursor-3 represents Comparative Example 2.

Evaluation Example 2 (Residual Lithium Amount)

The amount of $Li_2CO_3$ remaining on the positive electrode active material surface of exemplary embodiments and Comparative Examples according to heat treatment temperature is recorded in Table 2 below.

TABLE 2

| | Amount of $Li_2CO_3$ (ppm) | | | |
|---|---|---|---|---|
| heat treatment temperature | Comparative Example 1 | exemplary embodiment 1 | exemplary embodiment 2 | Comparative Example 2 |
| 250° C. | 5177 | 5577 | 11965 | 16029 |
| 300° C. | 4851 | 5351 | 11468 | 15103 |
| 350° C. | 4629 | 5029 | 10463 | 13300 |

According to the Table 2, the nickel content is the same, but when designing with increased manganese content, it can be seen that the amount of lithium remaining on the surface of the positive electrode active material finally obtained is reduced.

However, when the nickel content is the same, the cobalt content decreases as the manganese content increases. It will be described in the evaluation example 3 below.

Evaluation Example 3 (Initial Resistance and Efficiency Evaluation of Coin Cell)

The battery to which the positive electrode active material of exemplary embodiments and Comparative Examples was applied was operated under the following conditions, and the 0.1 C capacity and initial efficiency were recorded in Table 3.

Charge. 1.0C, CC/CV 4.25V, 1/20C cut-off

Discharge: 1.0C, CC, 3.0V cut-off

Among the results in Table 3, the case where the heat treatment temperature is 300° C. is shown as FIG. 3.

TABLE 3

| Division | | Comparative Example 1 | | exemplary embodiment 1 | | exemplary embodiment 2 | | Comparative Example 2 | |
|---|---|---|---|---|---|---|---|---|---|
| Sintering temperature | heat treatment temperature | 0.1 C capacity (mAh/g) | initial efficiency (%) | 0.1 C capacity (mAh/g) | initial efficiency (%) | 0.1 C capacity (mAh/g) | initial efficiency (%) | 0.1 C capacity (mAh/g) | initial efficiency (%) |
| 840 °C | 250 °C | 166.8 | 88.6 | 172.1 | 90.5 | 172.0 | 89.6 | 169.9 | 88.4 |
| 840 °C | 300 °C | 167.0 | 88.4 | 171.5 | 90.0 | 172.7 | 89.6 | 170.7 | 88.6 |
| 840 °C | 350 °C | 166.4 | 87.4 | 169.1 | 88.8 | 169.7 | 88.3 | 168.7 | 87.7 |

According to FIG. 3 and Table 3, in Comparative Example 2 in which the residual lithium amount on the surface is high, it can be confirmed that the initial resistance when charging the battery is high.

On the other hand, in Comparative Example 1, the residual lithium amount on the surface is relatively low, so the initial resistance is low, but it can be seen that the electrochemical characteristic of the battery is not good because the cobalt content is low.

Evaluation Example 4 (Coin Cell Room Temperature Cycle-Life Evaluation)

At room temperature 25° C., the cells to which each active material (calcination temperature: 840° C.) was applied were operated under the following conditions, and the result graph was shown in FIG. 4, and Table 4 shows the capacity retention rate after 25 cycles of driving compared to the initial stage.
Charge: 1.0C, CC/CV 4.3V, 1/20C cut-off
Discharge: 1.0C, CC, 3.0V cut-off

TABLE 4

| Division | | Comparative Example 1 | exemplary embodiment 1 | exemplary embodiment 2 | Comparative Example 2 |
|---|---|---|---|---|---|
| 840° C. | 25/1 cyc | 96.8% | 97.8% | 97.2% | 97.0% |

According to FIG. 4 and Table 4, it can be seen that among exemplary embodiments, the performance according to exemplary embodiment 1 is the best. This is due to residual lithium content and cobalt content.

Evaluation Example 5 (Coin Cell High Temperature Cycle-Life Evaluation)

At 45° C., which is higher than room temperature, the cells to which each active material (calcination temperature: 840° C.) is applied are operated under the following conditions, and the result graph is shown in FIG. 5, and Table 5 shows the capacity retention rate after 25 cycles of driving compared to the initial stage.
Charge: 1.0C, CC/CV 4.3V, 1/20C cut-off
Discharge: 1.0C, CC, 3.0V cut-off

TABLE 5

| Division | | Comparative Example 1 | exemplary embodiment 1 | exemplary embodiment 2 | Comparative Example 2 |
|---|---|---|---|---|---|
| 840° C. | 25/1 cyc | 98.2% | 98.6% | 98.4% | 98.2% |

According to FIG. 5 and Table 5, it can be seen that among exemplary embodiments, the performance according to exemplary embodiment 1 is the best. Likewise, this is due to residual lithium content and cobalt content.

The present invention is not limited to the embodiments and/or exemplary embodiments, but may be manufactured in various different forms, and a person having ordinary knowledge in the technical field to which the present invention belongs may have technical ideas or essential features of the present invention. It will be understood that it may be implemented in other specific forms without changing the. Therefore, the embodiments and/or exemplary embodiments described above are illustrative in all respects and should be understood as non-limiting.

The invention claimed is:
1. A positive electrode active material for a lithium secondary battery comprising a compound represented by the following Chemical Formula 1:

$$Li_{1+m}Ni_{1-w-x-y-z}Co_wMn_xM1_yM2_zO_{2-p}X_p \quad \text{[Chemical Formula 1]}$$

wherein, in the Chemical Formula 1,
M1 and M2 are different from each other, and any one element selected from the group consisting of Al, Mg, Zr, Sn, Ca, Ge, Ti, Cr, Fe, Zn, Y, Ba, La, Ce, Sm, Gd, Yb, Sr, Cu and Ga respectively,
X is any one element selected from the group consisting of F, N, S, and P, and
W, x, y, z, p and m satisfy: $0.125<w<0.202$, $0.153<x<0.225$, $0\leq y\leq 0.1$, $0\leq z\leq 0.1$, $0.34\leq w+x\leq 0.36$, $0\leq p\leq 0.1$, $0.1<m<0.2$, and $1.01<x/w\leq 1.36$.

2. The positive electrode active material of claim 1, wherein the positive electrode active material comprises a compound represented by the following Chemical Formula 2:

$$Li_{1+m}Ni_{1-w-x}Co_wMn_xO_{2-p}X_p \quad \text{[Chemical Formula 2]}$$

wherein, in the Chemical Formula 2,
X is any one element selected from the group consisting of F, N, S, and P, and
w, x and m satisfy $0.351\leq w+x\leq 0.354$, $0\leq p\leq 0.1$, $-0.1\leq m\leq 0.2$.

3. The positive electrode active material of claim 1, wherein an amount of Li remaining on the surface of the positive electrode active material is 5,000 ppm to 12,000 ppm.

4. The positive electrode active material of claim 1, wherein an average particle diameter of a primary particles of the positive electrode active material is 0.1 μm to 1 μm.

5. The positive electrode active material of claim 1, wherein the positive active material is a secondary particle, and
D50 particle diameter of the secondary particles is 7 μm to 15 μm.

6. A method for manufacturing a positive active material for lithium secondary battery, comprising:
obtaining a precursor by co-precipitation reaction of a nickel raw material, a cobalt raw material, a manganese raw material and a heterogeneous raw material; and
obtaining a positive electrode active material represented by Chemical Formula 1 below by mixing and sintering the precursor and lithium raw material,

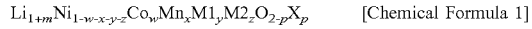   [Chemical Formula 1]

$$Li_{1+m}Ni_{1-w-x-y-z}Co_wMn_xM1_yM2_zO_{2-p}X_p$$

wherein, in the Chemical Formula 1:
M1 and M2 are different from each other, and any one element selected from the group consisting of Al, Mg, Zr, Sn, Ca, Ge, Ti, Cr, Fe, Zn, Y, Ba, La, Ce, Sm, Gd, Yb, Sr, Cu and Ga respectively,
X is any one element selected from the group consisting of F, N, S, and P, and
W, X, y, z, p and m are respectively $0.125<w<0.202$, $0.153<x<0.225$, $0 \leq y \leq 0.1$, $0 \leq z \leq 0.1$, $0.34 \leq w+x \leq 0.36$, $0 \leq p \leq 0.1$, $0.1 \leq m \leq 0.2$, and $1.01 \leq x/w \leq 1.36$.

7. The method of claim 6, wherein in the step of obtaining the positive active material, the mixed precursor and lithium raw material is sintered at 700° C. to 900° C. and then heat treated, the heat treatment temperature is 250° C. to 350° C., and a total of sintering is maintained for of about 30 hours.

8. The method of claim 7, wherein in the step of obtaining the positive active material, the heat treatment temperature is 280° C. to 320° C.

9. A lithium secondary battery, comprising:
a positive electrode;
a negative electrode; and
an electrolyte;
the positive electrode comprising the positive electrode active material according to claim 1.

* * * * *